US006543671B2

(12) United States Patent
Hatten et al.

(10) Patent No.: US 6,543,671 B2
(45) Date of Patent: Apr. 8, 2003

(54) APPARATUS AND METHOD FOR FRICTION STIR WELDING USING FILLER MATERIAL

(75) Inventors: Timothy E. Hatten, Arlington, TX (US); William J. Arbegast, Carriere, MS (US)

(73) Assignee: Lockheed Martin Corporation, Grand Praire, TX (US)

( * ) Notice: Subject to any disclaimer, the term of this patent is extended or adjusted under 35 U.S.C. 154(b) by 0 days.

(21) Appl. No.: 09/946,223

(22) Filed: Sep. 5, 2001

(65) Prior Publication Data

US 2003/0042292 A1 Mar. 6, 2003

(51) Int. Cl.$^7$ .................. B23K 31/02; B23K 20/12; B23K 37/00
(52) U.S. Cl. ..................... 228/112.1; 228/2.1
(58) Field of Search .................. 228/2.1, 112.1; 219/124.1, 137.2

(56) References Cited

U.S. PATENT DOCUMENTS

| | | | | |
|---|---|---|---|---|
| 3,965,329 A | * | 6/1976 | Petrides et al. | 219/124.1 |
| 5,460,317 A | | 10/1995 | Thomas et al. | 228/112.1 |
| 5,718,366 A | * | 2/1998 | Colligan | 156/580 |
| 5,769,306 A | * | 6/1998 | Colligan | 228/112.1 |
| 5,813,592 A | | 9/1998 | Midling et al. | 228/112.1 |
| 5,829,664 A | * | 11/1998 | Spinella et al. | 219/78.13 |
| 5,971,252 A | | 10/1999 | Rosen et al. | 228/112.1 |
| 5,975,406 A | * | 11/1999 | Mahoney et al. | 228/112.1 |
| 6,045,027 A | | 4/2000 | Rosen et al. | 228/112.1 |
| 6,053,391 A | | 4/2000 | Heideman et al. | 228/2.1 |
| 6,168,066 B1 | | 1/2001 | Arbegast | 228/102 |
| 6,199,745 B1 | | 3/2001 | Campbell et al. | 228/112.1 |
| 6,206,268 B1 | * | 3/2001 | Mahoney | 228/112.1 |
| 6,230,957 B1 | * | 5/2001 | Arbegast et al. | 148/516 |
| 6,237,835 B1 | * | 5/2001 | Litwinski et al. | 228/112.1 |
| 6,352,193 B1 | * | 3/2002 | Bellino et al. | 228/112.1 |
| 6,386,425 B2 | * | 5/2002 | Kawasaki et al. | 228/112.1 |
| 6,419,142 B1 | * | 7/2002 | Larsson | 228/112.1 |

FOREIGN PATENT DOCUMENTS

| | | | |
|---|---|---|---|
| EP | 0810054 A1 | * | 12/1997 |
| GB | 2306366 A | * | 5/1997 |
| WO | WO95/26254 | | 10/1995 |

* cited by examiner

Primary Examiner—Tom Dunn
Assistant Examiner—L. Edmondson
(74) Attorney, Agent, or Firm—Williams, Morgan & Amerson, P.C.

(57) ABSTRACT

A friction stir welding tool includes a body having an upper surface defining an entrance opening and a lower surface, and a pin having a lower surface defining an exit opening, wherein the pin extends from the lower surface of the body. The friction stir welding tool further includes a passageway defined by the body and the pin from the entrance opening to the exit opening and is capable of allowing a filler material to pass therethrough. A friction stir welding method includes applying a frictional heating source to a workpiece to plasticize a volume of the workpiece and applying the frictional heating source to a filler material to plasticize the filler material. The method further includes introducing the filler material into the volume of the workpiece and incorporating the filler material into the volume of the workpiece.

122 Claims, 9 Drawing Sheets

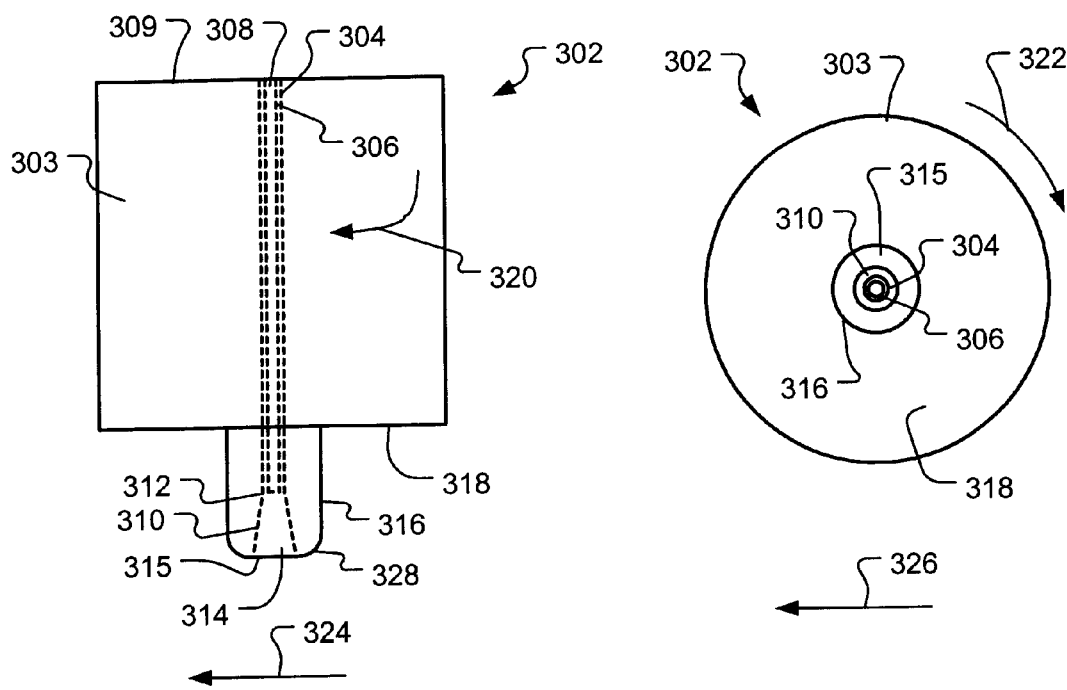
FIG. 3A
FIG. 3B
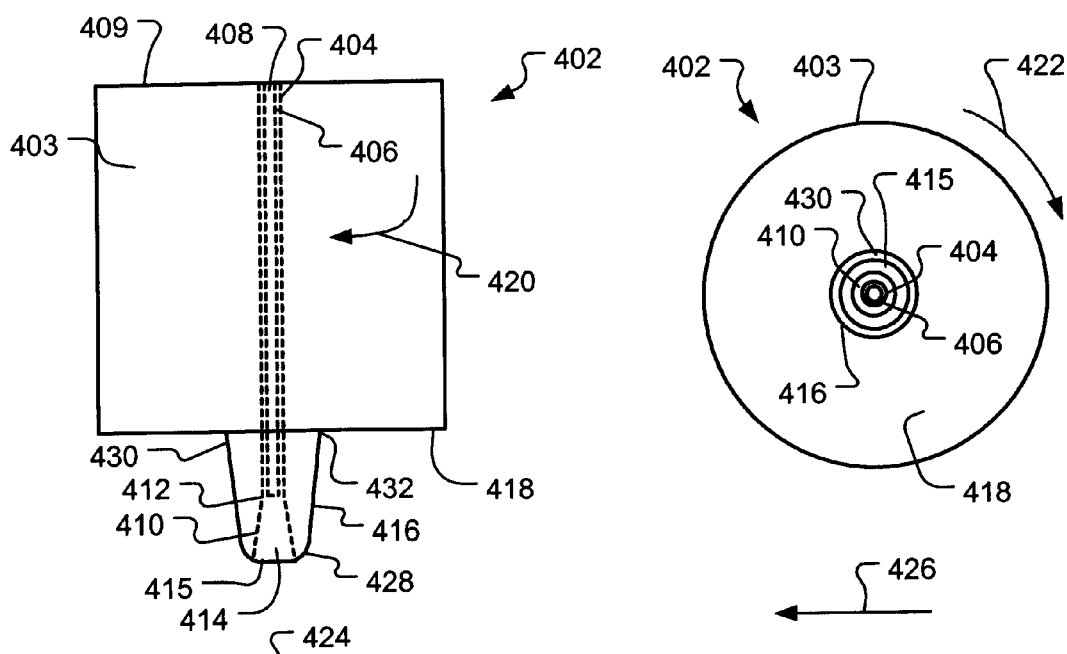
FIG. 4A
FIG. 4B

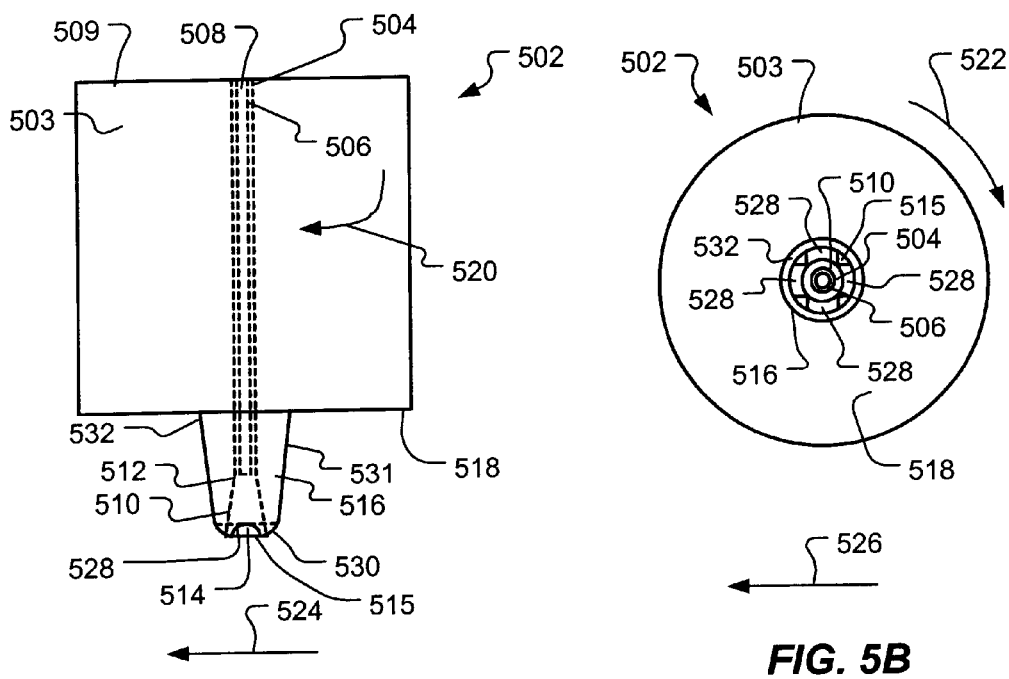
FIG. 5A
FIG. 5B
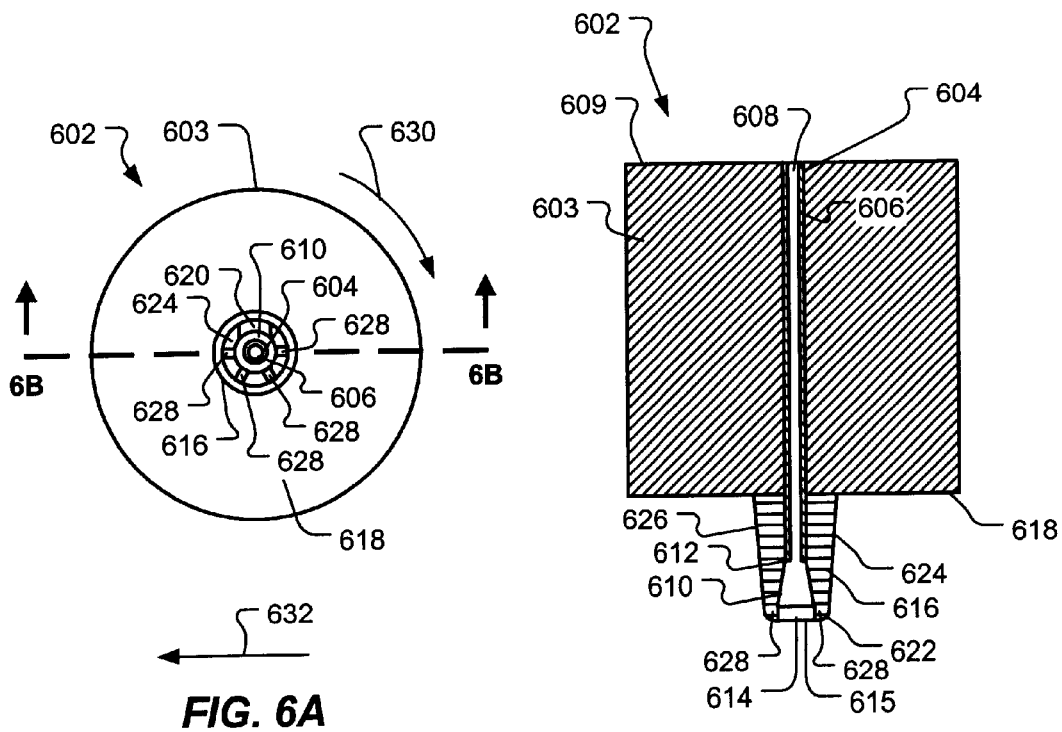
FIG. 6A
FIG. 6B

APPARATUS AND METHOD FOR FRICTION STIR WELDING USING FILLER MATERIAL

BACKGROUND OF THE INVENTION

1. Field of the Invention

This invention relates to an apparatus and method for friction stir welding, and, in one aspect, to an apparatus and method for friction stir welding using filler material.

2. Description of the Related Art

Workpieces made of some commercial metallic alloys (e.g., most 2000- and 7000-series aluminum alloys) are difficult to join by conventional welding processes (e.g., arc welding processes). For example, 2000-series aluminum alloys are sensitive in heat-affected zones (HAZs) where the base metal reaches temperatures between liquidus and solidus during welding. In this area, partial melting at grain boundaries forms a network containing brittle intermetallic compounds of $CuAl_2$. Thus, weld ductility can be substantially reduced. Further, conventional welding processes can create geometric distortions near the weld joint due to high temperature gradients (non-uniform heating) induced in the workpiece during welding. These distortions can cause warping and other dimensional defects in the workpiece, as well as residual stresses that can lead to premature failure by cracking in the weldment or HAZ (either due to static and/or fatigue stresses), lamellar tearing, or by stress-corrosion cracking in some metals.

In addition, some alloys and types of weld joints are difficult to join except in a flat position. For example, thick weldments are typically made in the flat position unless some way is provided to retain the weld metal in the joint, such as with chilled backing plates and to quickly solidify the weld metal and/or with chilled shoes to hold the weld metal in the joint during solidification. Further, traditional welding processes produce welding fumes, spatter, and a possibility of porosity in the deposited weld metal, due to entrained gases. Yet further, certain metals (e.g., aluminum and aluminum alloys) can have surface oxide layers that are insoluble in the molten weld metal. Thus, these oxide layers can readily become entrained in the weldment, causing defects that can decrease static and fatigue strength of the weldment. Accordingly, the oxide layers are typically removed by pickling, grinding, and/or brushing prior to the workpieces being conventionally welded.

Friction stir welding processes can overcome many of the problems encountered with traditional welding processes in metals. In a typical friction stir welding process, illustrated in FIG. 1, a cylindrical tool 102 having a shoulder 104 and a pin 106 is rotated (as indicated by arrow 107) and plunged (as indicated by arrow 109) into a joint line 108 between two abutted workpieces 110, 112 of sheet or plate material. As the pin 106 contacts the workpieces 110, 112, friction between the pin 106 and the workpieces 110, 112 generates heat to plasticize an area of the workpieces 110, 112 adjacent the joint line 108. As the pin 106 continues to plunge into the workpieces 110, 112, more material is plasticized, thus allowing the pin 106 to plunge further into the workpieces 110, 112. Plunging stops when the shoulder 104 comes into contact with and is forced against the workpieces 110, 112. Each of the workpieces 110, 112 is clamped onto an anvil 114 in such a manner as to prevent the abutting joint faces of the workpieces 110, 112 from being forced apart.

Frictional heat is generated between the shoulder 104, the pin 106, and the workpieces 110, 112. This heat causes the workpieces 110, 112 to soften or plasticize without reaching their melting point and allows the tool 102 to traverse (as indicated by arrow 113) along the joint line 108. As downward pressure is maintained (as indicated by the arrow 109) and the tool 102 moves along the joint 108 (as indicated by the arrow 113), the plasticized material is transferred from the leading edge 116 of the tool 102 to the trailing edge 118 of the tool 102, and is forged by intimate contact with the shoulder 104 and the pin 106, and is forced against the anvil 114. A solid-phase bond 120 is left between the workpieces 110, 112.

Process advantages can result from such a friction stir welding process (as in generally all friction welding processes) taking place in a solid phase below melting points of the materials being joined. Thus, since no melting occurs, continuous networks of intermetallic compounds (e.g., intermetallic compounds of $CuAl_2$ in 2000-series aluminum alloys) have little opportunity to form and generally no fumes or spatter are created. The friction stir welding process also produces lower distortion in the workpieces 110, 112, since much less heat is transferred into the workpieces 110, 112. Further, the friction stir welding process can be performed in any position, since the material along the joint line 108 is plasticized, not melted, and readily remains in place. Yet further, surface oxide layers are generally swept away during the friction stir welding process due to the friction between the shoulder 104, the pin 106 and the workpieces 110, 112. Thus, pickling, grinding, and/or brushing of the workpieces 110,112 are not generally required.

The friction stir welding process has several limitations, however. First, joints between workpieces to be friction stir welded generally must have better fit up than that required for joints between workpieces that are conventionally welded. In general, any gap between the workpieces to be joined must be less than 10 percent of the thickness of the workpieces. For example, if the workpieces to be joined have thicknesses of 12.7 mm (0.5 in), the maximum generally-acceptable gap is 1.27 mm (0.05 in). This requirement is due in large part to the fact that known friction stir welding processes do not employ the use of filler materials, which can be used to fill excessive gaps in weld joints. Such stringent fit up requirements can result in higher workpiece preparation costs and workpiece fixturing costs. These costs can escalate dramatically when large workpieces are joined. Further, traditional friction stir welding processes can generally be used on only a limited number of joint types, e.g., butt joints and edge joints. Joint types requiring a fillet, e.g., corner joints, lap joints, and filleted T-joints, cannot generally be accomplished using traditional friction stir welding processes, as filler metal is required to produce the fillet.

The present invention is directed to overcoming, or at least reducing, the effects of one or more of the problems set forth above.

SUMMARY OF THE INVENTION

In one aspect of the present invention, a friction stir welding tool includes a body having passageway therethrough through which a filler material may pass and a pin extending from a bottom of the body capable of creating friction when rotated against a workpiece to weld the workpiece.

According to another aspect of the present invention, an apparatus capable of friction stir welding is provided. The apparatus includes a friction stir welding tool having a body having an upper surface defining an entrance opening and a lower surface, and a pin having a lower surface defining an exit opening, wherein the pin extends from the lower surface of the body. The friction stir welding tool further includes a passageway from the entrance opening to the exit opening and is capable of allowing a filler material to pass therethrough. The apparatus further includes a spindle capable of rotating the friction stir welding tool, wherein the spindle has a passageway therethrough capable of allowing the filler material to pass therethrough and wherein the passageway through the spindle communicates with the passageway through the friction stir welding tool. Further, a filler material feeder is provided that is capable of feeding the filler material, wherein the filler material feeder feeds the filler material into the passageway through the spindle, and a device capable of holding a workpiece.

In another aspect of the present invention, a friction stir welding method includes applying a frictional heating source to a workpiece to plasticize a volume of the workpiece and applying the frictional heating source to a filler material to plasticize the filler material. The method further includes introducing the filler material into the volume of the workpiece and incorporating the filler material into the volume of the workpiece.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which:

FIG. 3A is a side view of a friction stir welding tool according to a first embodiment of the present invention;

FIG. 3B is a bottom view of the friction stir welding tool of FIG. 3A;

FIG. 4A is a side view of a friction stir welding tool according to a second embodiment of the present invention;

FIG. 4B is a bottom view of the friction stir welding tool of FIG. 4A;

FIG. 5A is a side view of a friction stir welding tool according to a third embodiment of the present invention;

FIG. 5B is an bottom view of the friction stir welding tool of FIG. 5A;

FIG. 6A is a bottom view of a friction stir welding tool according to a fourth embodiment of the present invention;

FIG. 6B is a cross-sectional view of the friction stir welding tool of FIG. 6A taken along the 6B—6B line;

Figure 1:
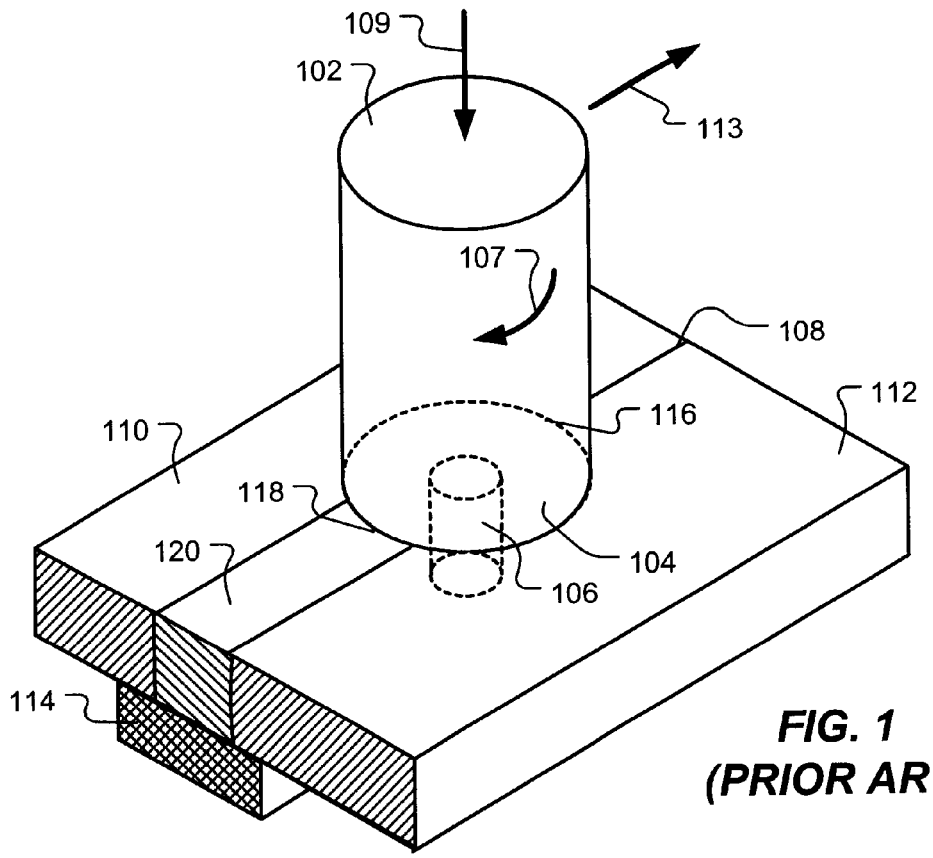
FIG. 1 is a stylized diagram illustrating a conventional friction stir welding process.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 2:
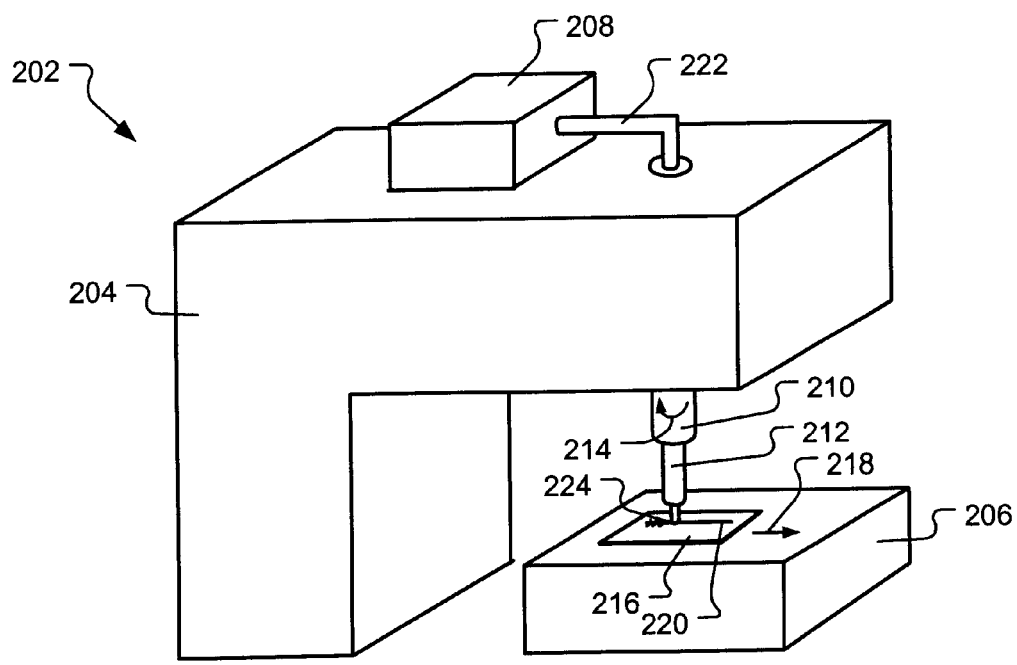
FIG. 2 is a stylized diagram of an apparatus capable of friction stir welding according to the present invention.

As illustrated in FIG. 2, an apparatus 202 capable of friction stir welding using filler material in accordance with the present invention is provided. The apparatus 202 comprises a machine body 204, a work holding device 206, and a filler material feeder 208. The filler material feeder 208 houses a mechanism (not shown) by which filler material (also not shown) may be dispensed as is discussed below. The apparatus 202 further includes a spindle 210 that is capable of holding or chucking and rotating a friction stir welding tool 212. The spindle 210 and the friction stir welding tool 212 have passageways (not shown) therethrough along each of their longitudinal dimensions. As the spindle 210 rotates (as indicated by arrow 214) and moves relative to the workpiece 216 (as indicated by arrow 218) to weld the joint 220 in a workpiece 216, the filler material is fed by the filler material feeder 208 through the conduit 222, through the passageway in the spindle 210, and through the passageway in the friction stir welding tool 212 to the welding area 224 as will be discussed further below. In the illustrated embodiment the workpiece 216 is mounted on the work holding device 206. It is within the scope of the present invention, however, for the workpiece 216 to be attached to any suitable structure, e.g., a fixture, a work-holding device, or the like.

The scope of the present invention encompasses any way of moving the spindle 210 relative to the workpiece 216. For example, in one embodiment, the apparatus 202 comprises a device (not shown) capable of moving the spindle 210, and thus the friction stir welding tool 212. In another embodiment, the apparatus 202 comprises a device (not shown) capable of moving the work holding device 206, and thus the workpiece 216. In one embodiment, the filler material feeder 208 is capable of feeding the filler material at a constant feed rate during the welding process. In another embodiment, the filler material feeder 208 is capable of feeding the filler material at a feed rate that can vary during the welding process as desired. In yet a further embodiment, the filler material feeder 208 is capable of intermittently feeding the filler material during the welding process as in, for example, a Jetline Engineering model CWF-30B, CWF23B, or the like. For example, the filler material feeder 208 repeats a cycle comprising feeding the filler material for a period of time and then stopping the feeding of the filler material. In yet another embodiment, the filler is material feeder 208 is capable of heating the filler material prior to the filler material being fed into the conduit 222 as in, for example, a Jetline Engineering hot wire feed system model HWP-50C or the like. Further, the filler material can be heated by another source (e.g., an induction heater or the like, not shown) prior to being fed into the weld zone.

The filler material described herein can be a solid wire of filler material or can be a tubular wire having powdered filler metal and/or one or more dispersion strengthening materials (e.g., micron and sub-micron sized carbide powders, nitride powders, oxide powders, ceramic powders, chopped ceramic fibers, and the like) capable of improving mechanical properties of or inhibiting grain growth in the weldment. The present invention is not limited, however, to dispersion strengthening materials of a particular size or range of sizes. Further, the filler material can be a powdered filler material or a liquid filler material, either type of filler material comprising solely a material similar to the material of the workpieces being joined or a combination of a material similar to the material of the workpieces being joined and one or more dispersion strengthening materials (as described above). For example, if metallic workpieces are to be joined, the filler material can be a suitable metallic filler material or a suitable metallic filler material with dispersion strengthening materials (as described above) therein.

These materials may be introduced to add more material as required by certain joint configurations, to eliminate surface indentation that my occur when welding certain joint configurations, and/or to add alloying elements to modify the microstructure of the weldment for the purposes of enhancing static properties, fatigue properties, and/or corrosion resistance of the weldment. Further, these materials may be introduced to inhibit the occurrence of abnormal grain growth that may result from post-friction stir welding solution heat treatment and aging operations.

Thus, the present invention encompasses a method of introducing a filler material into a weld nugget during a friction stir welding process. In one embodiment, the method includes introducing a solid wire, a powder-filled tubular wire, a powder filler material, or a liquid filler material into a weld nugget during a friction stir welding process. The filler material may contain dispersion strengthening materials (as described above) or may be solely dispersion strengthening materials (as described above).

Referring now to FIGS. 3A and 3B, a first embodiment of the friction stir welding tool 212 is shown. A friction stir welding tool 302 according to the present invention has a body 303 and a passageway 304 through the friction stir welding tool 302 capable of allowing a filler material (not shown) to pass therethrough. The passageway 304 further comprises an entrance opening 308 in an upper surface 309 of the body 303 and a flared portion 310 that transitions from a diameter at a transition location 312 along the passageway 304 to a larger diameter of an exit opening 314 in a lower surface 315 of a pin 316. While the illustrated embodiment provides the passageway 304 having the flared portion 310, it is within the scope of the present invention for the passageway 304 to have no flared portion, for the passageway 304 to taper from the entrance opening 308 to the exit opening 314, or for the flared portion 310 to begin at a location other than the transition location 312 along the passageway 304.

In one embodiment, a tubular liner 306, made of a material able to withstand high temperatures (e.g., a ceramic material or the like), is disposed within the passageway 304 to allow the filler material to pass through the passageway 304 with less restriction. In the illustrated embodiment, the tubular liner 306 extends generally through the passageway 304 from the entrance opening 308 to the transition location 312; however, the scope of the present invention encompasses the tubular liner 306, when present, extending along any in portion of the passageway 304. In the illustrated embodiment, the tool 302 includes the pin 316 extending from a lower surface 318, wherein the pin 316 and the lower surface 318 contact and plasticize the weld areas in the workpiece or workpieces (not shown) during the friction stir welding process.

Friction between the pin 316, the lower surface 318, and the workpiece generates heat to plasticize the area being welded. As the tool 302 is rotated (as indicated by arrows 320 and 322) and is traversed (as indicated by arrows 324 and 326) during the friction stir welding process, the filler material is fed through the passageway 304, is dispersed from the tool 302 in the flared portion 310, is entrained into the plasticized weld joint material, and becomes an integral part of the weldment. In the case of the filler material being a wire (e.g., a solid wire or a powder-filled tubular wire), the wire comes into contact with the flared portion 310 as the wire is fed through the passageway 304. The wire is broken up as it becomes frictionally engaged with the flared portion 310 and is dispersed. In the case of powdered filler materials or liquid filler materials, the materials flow into the flared portion 310 and are dispersed from the tool 302.

In the illustrated embodiment, the pin 316 further comprises a radiused portion 328 that decreases an amount of force required to initially plunge the pin 316 into the workpiece (not shown) to be welded. However, it is within the scope of the present invention for the pin 316 to omit the radiused portion 328. The scope of the present invention encompasses the pin 316 having any desired profile.

Referring now to FIGS. 4A and 4B, a second embodiment of the friction stir welding tool 212 in FIG. 2 is shown. As compared to the embodiment of FIGS. 3A and 3B, the embodiment illustrated in FIGS. 4A and 4B includes a pin 416 that is tapered from an upper end 432 to a smaller diameter at a radiused portion 428.

A friction stir welding tool 402 according to the present invention has a body 403 and a passageway 404 through the friction stir welding tool 402 capable of allowing a filler material (not shown) to pass therethrough. The passageway 404 further comprises an entrance opening 408 in an upper surface 409 of the body 403 and a flared portion 410 that transitions from a diameter at a transition location 412 along the passageway 404 to a larger diameter of an exit opening 414 in a lower surface 415 of the pin 416. While the illustrated embodiment provides the passageway 404 having the flared portion 410, it is within the scope of the present invention for the passageway 404 to have no flared portion, for the passageway 404 to taper from the entrance opening 408 to the exit opening 414, or for the flared portion 404 to begin at a location other than the transition location 412 along the passageway 404.

In one embodiment, a tubular liner 406, made of a material able to withstand high temperatures (e.g., a ceramic material or the like), is disposed within the passageway 404 to allow the filler material to pass through the passageway 404 with less restriction. In the illustrated embodiment, the tubular liner 406 extends generally through the passageway 404 from the entrance opening 408 to the transition location 412; however, the scope of the present invention encompasses the tubular liner 406, when present, extending along any portion of the passageway 404. In the illustrated embodiment, the tool 402 includes the pin 416 extending from a lower surface 418, wherein the pin 416 and the lower surface 418 contact and plasticize the weld areas in the workpiece or workpieces (not shown) during the friction stir welding process.

Friction between the pin 416, the lower surface 418, and the workpiece generates heat to plasticize the area being welded. As the tool 402 is rotated (as indicated by arrows 420 and 422) and is traversed (as indicated by arrows 424 and 426) during the friction stir welding process, the filler material is fed through the passageway 404, is dispersed from the tool 402 in the flared portion 410, is entrained into the plasticized weld joint material, and becomes an integral part of the weldment. In the case of the filler material being a wire (e.g., a solid wire or a powder-filled tubular wire), the wire comes into contact with the flared portion 410 as the wire is fed through the passageway 404. The wire is broken up as it becomes frictionally engaged with the flared portion 410 and is dispersed. In the case of powdered filler materials or liquid filler materials, the materials flow into the flared portion 410 and are dispersed from the tool 402.

In the illustrated embodiment, the pin 416 further comprises the radiused portion 428 that decreases an amount of force required to initially plunge the pin 416 into the workpiece (not shown) to be welded. However, it is within the scope of the present invention for the pin 416 to omit the radiused portion 428. In the embodiment illustrated in FIGS. 4A and 4B, the side surface 430 of the pin 416 is tapered from a larger diameter at the upper end 432 to a smaller diameter at the radiused portion 428 to further decrease the amount of force required to initially plunge the pin 416 into the workpiece. Note the distinction from the embodiment shown in FIGS. 3A and 3B, wherein the side surface of the pin 316 is not tapered. The scope of the present invention, however, encompasses the pin 416 having any desired profile.

A third embodiment of the friction stir welding tool 212 shown in FIG. 2 is illustrated in FIGS. 5A and 5B. As compared to the embodiment of FIGS. 4A and 4B, the embodiment illustrated in FIGS. 5A and 5B includes a plurality of openings 528 leading from a flared portion 510 through a side surface 531 of a pin 516. A friction stir welding tool 502 comprises a body 503 and a passageway 504 through the friction stir welding tool 502 capable of allowing a filler material (not shown) to pass therethrough. The passageway 504 further comprises an entrance opening 508 in an upper surface 509 of the body 503 and the flared portion 510 that transitions from a diameter at a transition location 512 along the passageway 504 to a larger diameter of an exit opening 514 in a lower surface 515 of the pin 516. While the illustrated embodiment provides the passageway 504 having the flared portion 510, it is within the scope of the present invention for the passageway 504 to have no flared portion, for the passageway 504 to taper from the entrance opening 508 to the exit opening 514, or for the flared portion 510 to begin at a location other than the transition location 512 along the passageway 504.

In one embodiment, a tubular liner 506, made of a material able to withstand high temperatures (e.g., a ceramic material or the like), is disposed within the passageway 504 to allow the filler material to pass through the passageway 504 with less restriction. In the illustrated embodiment, the tubular liner 506 extends generally through the passageway 504 from the entrance opening 508 to the transition location 512; however, the scope of the present invention encompasses the tubular liner 506, when present, extending along any portion of the passageway 504, including from the entrance opening 508 to the exit opening 514. In the illustrated embodiment, the tool 502 includes a pin 516 extending from a lower surface 518, wherein the pin 516 and the lower surface 518 contact and plasticize the weld areas in the workpiece or workpieces (not shown) during the friction stir welding process. In the illustrated embodiment, the pin 516 comprises the plurality of openings 528 leading from the flared portion 510 through the side surface 531. The pin 516 of the illustrated embodiment further comprises a radiused portion 530 that decreases an amount of force required to initially plunge the pin 516 into the workpiece (not shown) to be welded. However, it is within the scope of the present invention for the pin 516 to omit the radiused portion 530.

In the embodiment illustrated in FIGS. 5A and 5B, the side surface 531 of the pin 516 is tapered from a larger diameter at an upper end 532 to a smaller diameter at the radiused portion 530 to further decrease the amount of force required to initially plunge the pin 516 into the workpiece. The scope of the present invention, however, encompasses the pin 516 having any profile.

As the tool 502 is rotated (as indicated by arrows 520 and 522) and is traversed (as indicated by arrows 524 and 526) during the friction stir welding process, the filler material is through the passageway 504, dispersed in the flared portion 510 and through at least one of the openings 528, is entrained into the plasticized weld joint material, and becomes an integral part of the weldment. In the case of the filler material being a wire (e.g., a solid wire or a powder-filled tubular wire), the wire comes into contact with the flared portion 510 as the wire is fed through the passageway 504. The wire is broken up as it becomes frictionally engaged with the flared portion 510. The wire then is further broken up as it is cut by the edges of the openings 528 and is dispersed from the tool 502. In the case of powdered filler materials or liquid filler materials, the materials flow into the flared portion 510, flow out the openings 528, and are dispersed from the tool 502. The scope of the present invention further encompasses an embodiment wherein at least one opening 528 is provided. Thus, particular embodiments of the present invention can comprise one or more than one opening 528.

Referring now to FIGS. 6A and 6B, a fourth embodiment of the friction stir welding tool 212 in FIG. 2 is shown. As compared to the previously described embodiments, the illustrated embodiment includes one or more protrusions 628 within a passageway 604. The illustrated embodiment provides a friction stir welding tool 602 having a body 603 and the passageway 604 through the friction stir welding tool 602 capable of allowing a filler material (not shown) to pass therethrough. The passageway 604 further comprises an entrance opening 608 in an upper surface 609 of the body 603 and a flared portion 610 that transitions from a diameter at a transition location 612 along the passageway 604 to a larger diameter of an exit opening 614 in a lower surface 615 of a pin 616. While the illustrated embodiment provides the passageway 604 having the flared portion 610, it is within the scope of the present invention for the passageway 604 to have no flared portion, for the passageway 604 to taper from the entrance opening 608 to the exit opening 614, or for the flared portion 604 to begin at a position other than at the transition location 612 along the passageway 604.

In one embodiment, a tubular liner 606, made of a material able to withstand high temperatures (e.g., a ceramic material or the like), is disposed within the passageway 604 to allow the filler material to pass through the passageway 604 with less restriction. In the illustrated embodiment, the tubular liner 606 extends generally through the passageway 604 from the entrance opening 608 to the transition location 612; however, the scope of the present invention encompasses the tubular liner 606, when present, extending along any portion of the passageway 604, including from the entrance opening 608 to the exit opening 614. In the illustrated embodiment, the friction stir welding tool 602 includes the pin 616 and a lower surface 618, wherein the pin 616 and the lower surface 618 contact and plasticized the weld areas in the workpiece or workpieces (not shown) during the friction stir welding process. In the illustrated embodiment, the pin 616 comprises an opening 620 leading from the flared portion 610 through a side surface 624. The pin 616 of the illustrated embodiment further comprises a radiused portion 622 that decreases an amount of force required to initially plunge the pin 616 into the workpiece to be welded. However, it is within the scope of the present invention for the pin 616 to omit the radiused portion 622.

In the illustrated embodiment, the side surface 624 of the pin 616 is tapered from a larger diameter at an upper end 626 to a smaller diameter at the radiused portion 622 to further decrease the amount of force required to initially plunge the pin 616 into the workpiece (not shown). The scope of the present invention, however, encompasses the pin 616 having any desired profile. The pin 616 further comprises a plurality of protrusions 628 within the passageway 604. As the friction stir welding tool 602 is rotated (as indicated by arrow 630) and is traversed (as indicated by arrow 632) during the friction stir welding process, the filler material is fed through the passageway 604 and into the flared portion 610, is dispersed within the flared portion 610, is dispersed by at least one of the protrusions 628, passes through the opening 620, is entrained into the plasticized weld joint material, and becomes an integral part of the weldment. In the case of the filler material being a wire (e.g., a solid wire or a powder-filled tubular wire), the wire comes into contact with the flared portion 610 as the wire is fed through the passageway 604. The wire is broken up as it becomes frictionally engaged with the flared portion 610. The wire then is further broken up as it is cut by the edges of the protrusions 628 and the opening 620 and is dispersed from the friction stir welding tool 602. In the case of powdered filler materials or liquid filler materials, the materials flow into the flared portion 610 and are dispersed by the protrusions 628 and the openings 620. The scope of the present invention further encompasses embodiments wherein at least one opening 620 is provided and wherein no openings 620 are provided. Thus, particular embodiments of the present invention can comprise none, one, or more than one opening 620. Further, the scope of the present invention encompasses the pin 616 having at least one protrusion 628. Thus, particular embodiments of the present invention can comprise one or more protrusions 628.

Figure 7A:
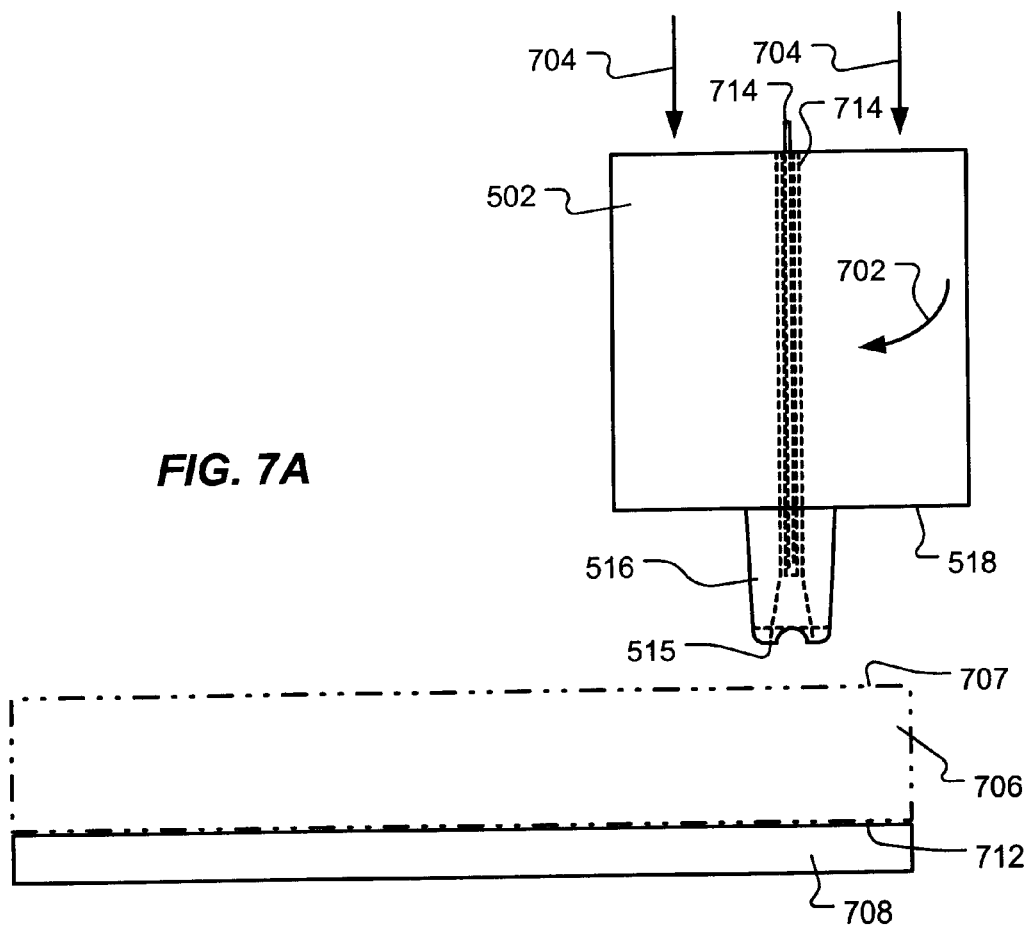
FIGS. 7A–7D are side views of the friction stir welding tool of FIGS. 5A and 5B illustrating a friction stir welding process according to the present invention.
Figure 7B:
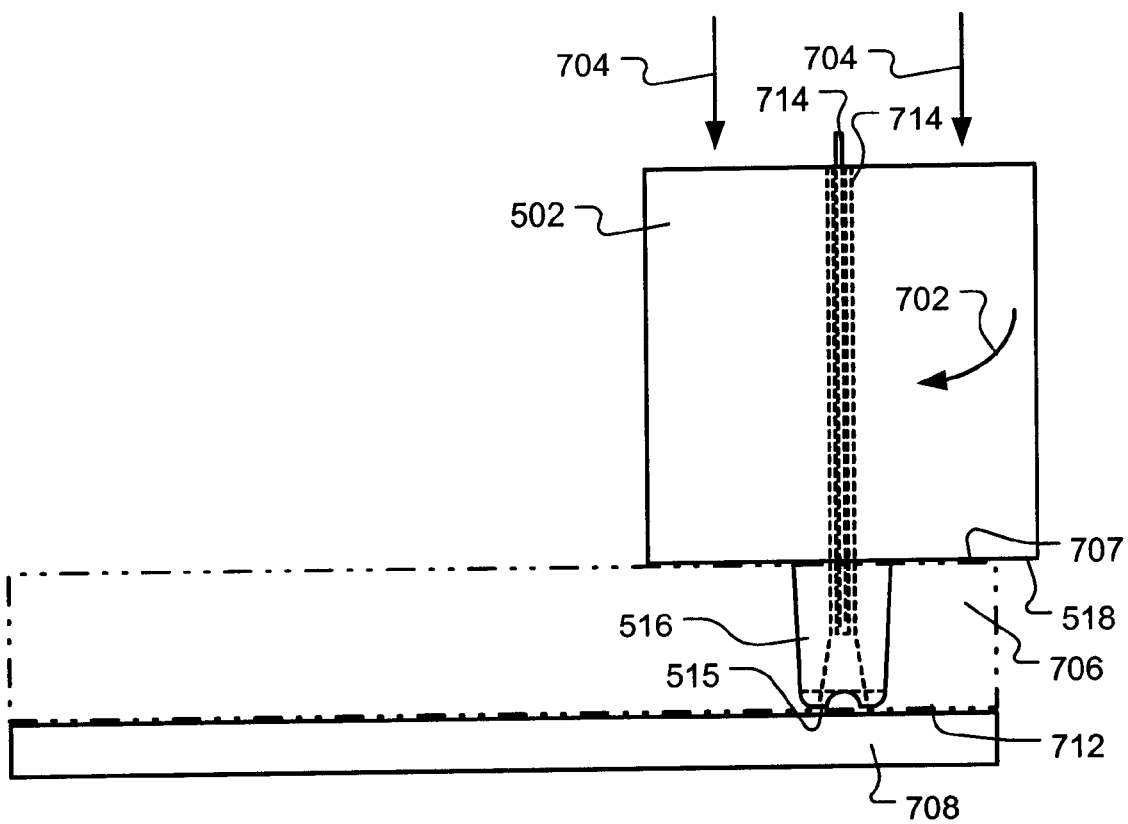

FIGS. 7A through 7D illustrate a weldment being made by the friction stir welding tool of FIGS. 5A and 5B as a frictional heating source. The friction stir welding tool can be, however, any friction stir welding tool disclosed herein or equivalents. As illustrated in FIGS. 7A and 7B, the friction stir welding tool 502 is rotated (as indicated by arrow 702) and is plunged (as indicated by arrows 704) into the workpiece 706 (shown in phantom) until the lower surface 518 contacts and is forced against a top surface 707 of the workpiece 706. The plunging operation can be accomplished within the joint to be welded or can be accomplished in a run-on tab (not shown) adjacent the joint to be welded. As the friction stir welding tool 502 plunges into the workpiece 706, a volume of the workpiece 706 is plasticized in an area to be welded. When the pin 516 is fully plunged into the workpiece 706, a bottom surface 515 of the pin 516 is proximal to the lower surface 712 of the workpiece 706 so that the lower surface 712 is plasticized. In one embodiment, the filler material 714 is not fed through the passageway 504 during plunging. The anvil 708 can be positioned against the workpiece 706 as illustrated or may be spaced away from the workpiece 706 to form a fillet or other feature on the bottom surface 712 of the workpiece 706. Thus, the anvil 708 forms the bottom surface of the weldment in the illustrated embodiment.

Figure 7C:
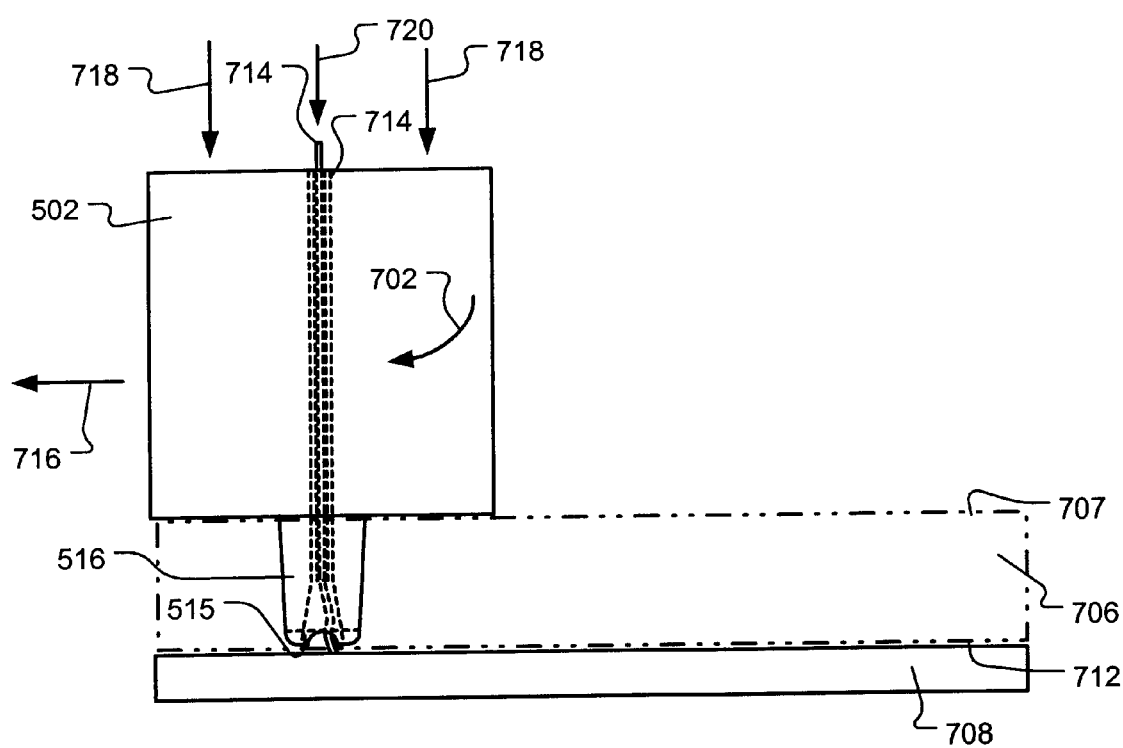

Referring now to FIG. 7C, the friction stir welding tool 502 continues to be rotated (as indicated by the arrow 702) and is moved along the joint to be welded (as indicated by arrow 716) as pressure (as indicated by arrows 718) is applied to the workpiece 706 by the lower surface 518. The filler material 714 is fed (as indicated by arrow 720) through the passageway 504 and into the weldment. If the anvil 708 is not spaced away from the workpiece 706 along the joint being welded (as illustrated in FIGS. 7A–7D), and thus is adjacent the workpiece 706 along the joint being welded, the filler material 714 fed into the weldment fills space within the joint being welded. If the anvil 708 is spaced away from the workpiece 706, the filler material 714 fed into the weldment fills the space within the joint being welded and the space between the anvil 708 and the lower surface 712 of the workpiece 706. In this situation, as the lower surface 712 is plasticized, filler material from the filler material 714 is pushed through the lower surface 712, and the filler material from the filler material 714 fills the space between the anvil 708 and the lower surface 712.

Figure 7D:
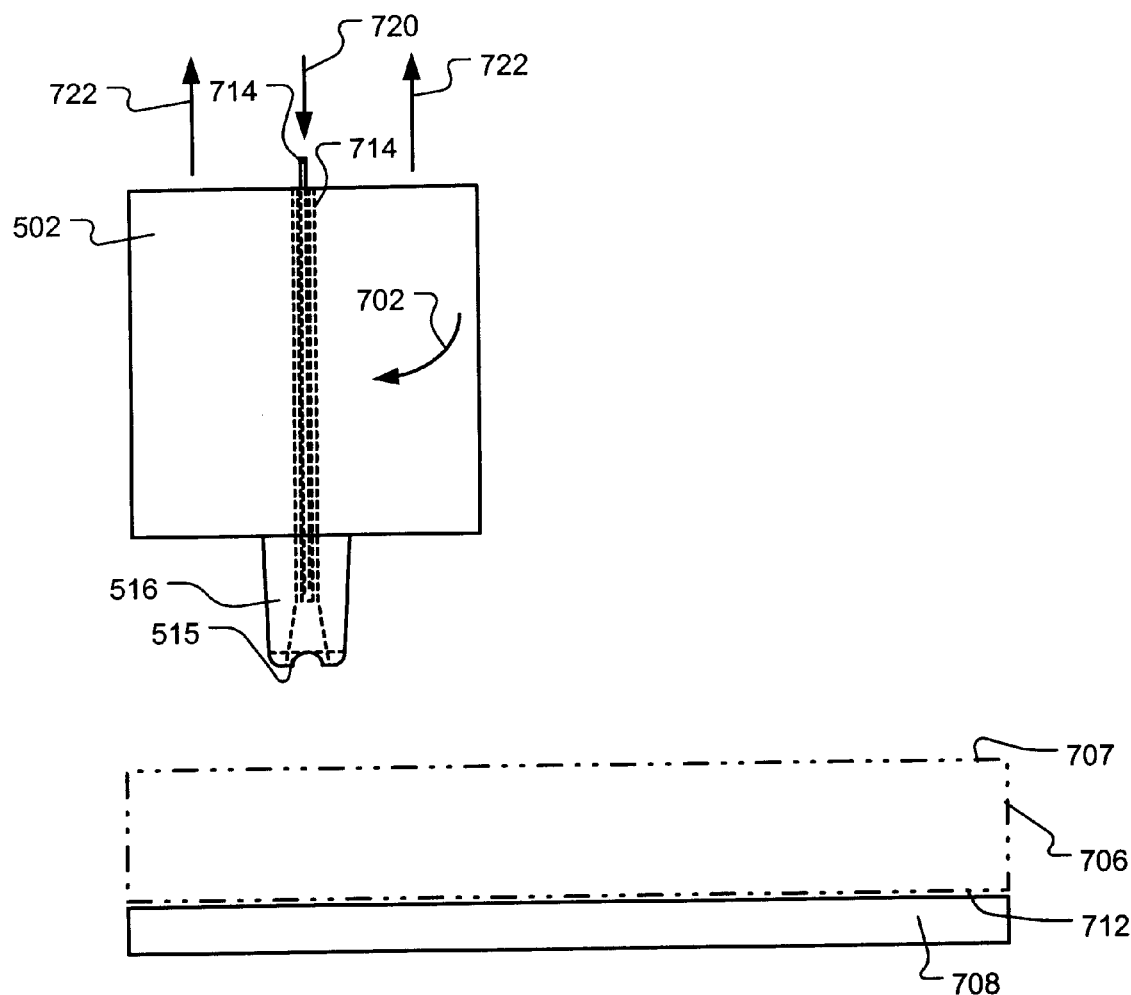

At the end of the weld joint, as illustrated in FIG. 7D, the pin 516 is retracted (as indicated by arrows 722) from the workpiece 706 while it continues to be rotated (as indicated by the arrow 702). In one embodiment, the filler material 714 is fed through the passageway 504 (as indicated by the arrow 720) as the pin 516 is retracted, in which case the filler material 714 adds filler material to the void left by the pin 516 in the workpiece 706. In another embodiment, the filler material 714 is not fed through the passageway 504 as the pin 516 is retracted from the workpiece 706, thus leaving a void in the workpiece. The pin 516 can be retracted within the welded joint or can be retracted in a run-off tab (not shown) adjacent the welded joint.

A workpiece, as described herein, can be a single workpiece having a joint therein to be welded or to a plurality of workpieces having adjacent edges forming joints to be welded.

Figure 8A:
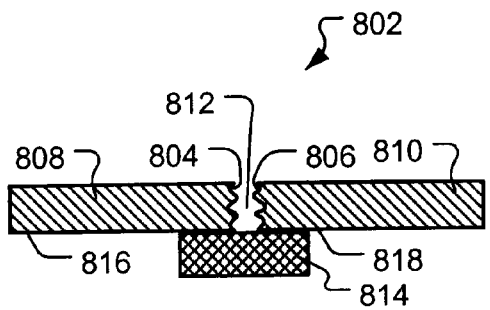
FIG. 8A is a stylized cross-sectional view of a butt joint to be welded having poor fit up.
Figure 8B:
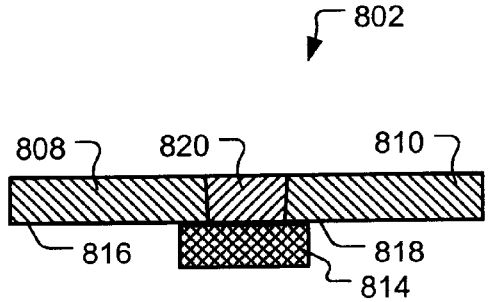
FIG. 8B is a stylized cross-sectional view of the butt joint of FIG. 8A that has been welded according to the present invention.

FIG. 8A illustrates an example of a butt joint 802 having poor fitup. Joint edges 804, 806 of the workpieces 808, 810, respectively, are irregular and a gap 812 between the joint edges 804, 806 of the workpieces 808, 810 is greater than generally can be accommodated by traditional friction stir welding. An anvil 814 is provided adjacent the lower surfaces 816, 818 of the workpieces 808, 810, respectively, and covers the gap 812. FIG. 8B illustrates an example of the butt joint 802 after being welded according to the present invention, wherein the gap 812 has been replaced with a weldment 820. According to the present method, material adjacent the joint edges 804, 806 is plasticized along with filler material introduced during the friction stir welding process. These materials are intermixed and are forged against the lower surface of the friction stir welding tool (e.g., the lower surface 518 of the friction stir welding tool 502) and the anvil 814 to form the weldment 820.

Figure 9A:
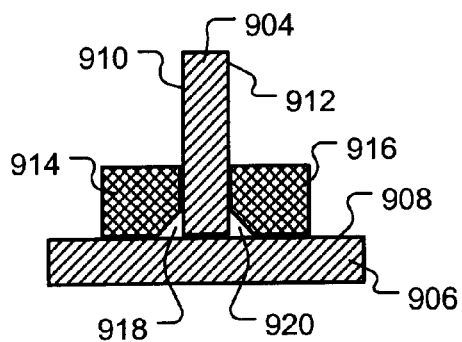
FIG. 9A is a stylized cross-sectional view of a T-joint to be welded.
Figure 9B:
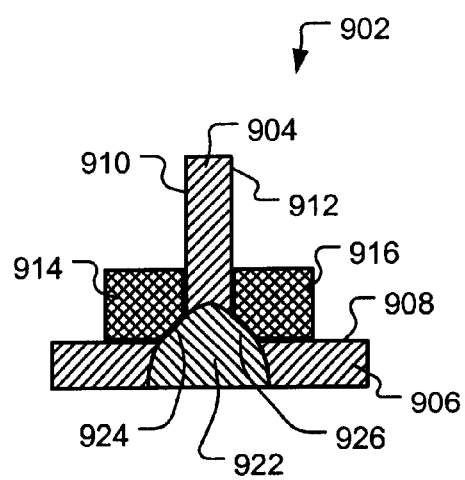
FIG. 9B is a stylized cross-sectional view of the T-joint of FIG. 9A that has been welded according to the present invention.

Referring now to FIG. 9A, an exemplary T-joint 902 is shown having a leg 904 and a web 906. Adjacent an upper side 908 of the web 906 and sides 910, 912 of the leg 904 are two anvils 914, 916. Each of the anvils 914, 916 is shaped such that, when they are in position as illustrated, fillet spaces 918, 920 are created. FIG. 9B illustrates an example of the T-joint 902 after being welded according to the present invention, wherein a weldment 922 joins the leg 904 and the web 906. According to the present method, a portion of the leg 904 and a portion of the web 906 are plasticized along with the filler material introduced during the friction stir welding process. These materials are intermixed and are forged against the lower surface of the friction stir welding tool (e.g., the lower surface 518 of the friction stir welding tool 502) and the anvils 914, 916 to form the weldment 922 having fillets 924 and 926. The present invention, however, is not limited to producing fillets, as illustrated in FIGS. 9A and 9B, but encompasses the production of any shaped weldment, e.g., fillets, external beads, and the like.

Figure 10:
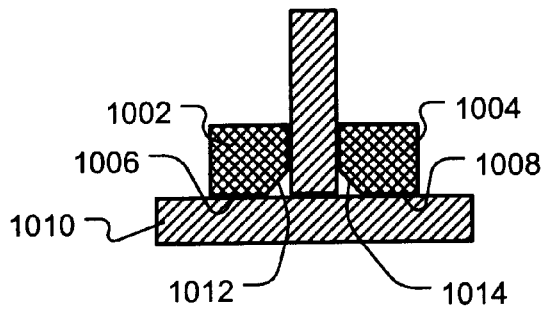
FIG. 10 is a stylized cross-sectional view of the T-joint of FIG. 9A illustrating anvils according to the present invention.

While some embodiments of the present invention utilize conventional, flat anvils, some embodiments depart from conventional practice by using anvils 1002, 1004 according to the present invention having surfaces 1006, 1008 capable of being held against a workpiece 1010 and depressed portions 1012, 1014 spaced away from the workpiece 1010, as illustrated in FIG. 10. The depressed portion 1012, 1014 corresponds to a shape of a portion of a friction stir weld (e.g., the fillet 924, 926 of the weldment 922). Thus, as illustrated in FIGS. 9A & 9B, the anvils 1002, 1004 of the present invention allow weld profiles to be produced that are not conventionally attainable. The present anvils is not limited to producing fillets, as illustrated in FIG. 10, but encompasses any anvil having a depressed portion capable of producing a shaped weld bead.

Figure 11:
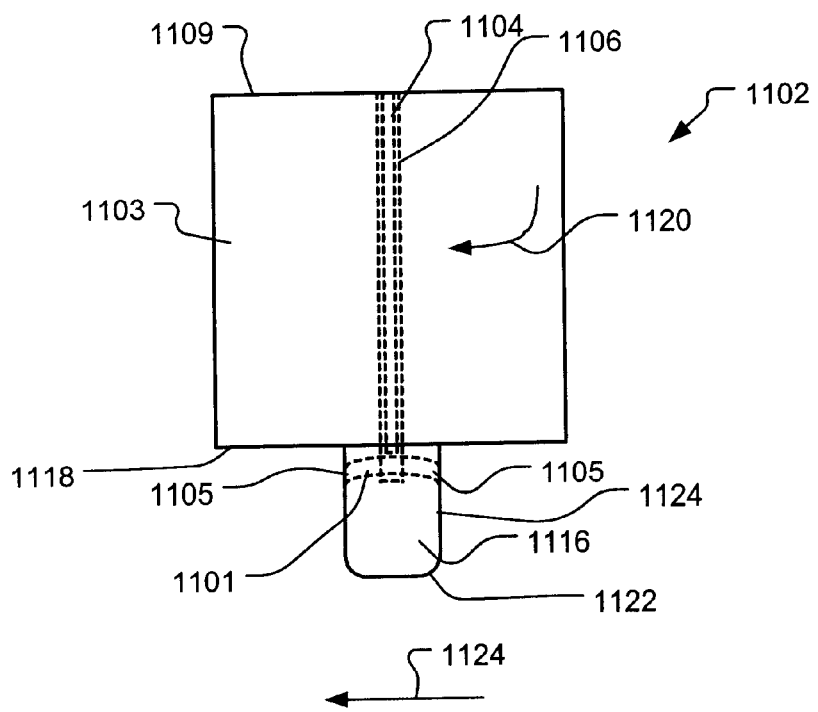
FIG. 11 is a side view of a friction stir welding tool according to a fifth embodiment of the present invention.

Referring now to FIG. 11, a fifth embodiment of the friction stir welding tool 212 in FIG. 2 is presented. As compared to the previously described embodiments, the illustrated embodiment includes a passageway 1101 extending through a pin 1116 communicating with exit openings 1105. The illustrated embodiment provides a friction stir welding tool 1102 having a body 1103 and a passageway 1104 through the body 1103. The passageway 1101 through the pin 1116 is in communication with the passageway 1104 through the body 1103.

In one embodiment, a tubular liner 1106, made of a heat-resistant material (e.g., a ceramic material or the like) is disposed within the passageway 1104 to allow the filler material to pass through the passageway 1104 with less restriction. In the illustrated embodiment, the tubular liner 1106 extends generally through the passageway 1104; however, the scope of the present invention encompasses the tubular liner 1106, when present, extending along any portion of the passageway 1104. In the illustrated embodiment, the friction stir welding tool 1102 includes the pin 1116 and a lower surface 1118 of the body 1103, wherein the pin 1116 and the lower surface 1118 of the body 1103 contact and plasticize the weld areas in the workpiece or workpieces (not shown) during the friction stir welding process. In the illustrated embodiment, the pin 1116 comprises openings 1105 leading from the passageway 1101 through a side surface 1124. The scope of the present invention, however, includes any number of passageways 1101 and any number of openings 1105. The pin 1116 of the illustrated embodiment further comprises a radiused portion 1122 that decreases an amount of force required to initially plunge the pin 1116 into the workpiece to be welded. However, it is within the scope of the present invention for the pin 1116 to omit the radiused portion 1122.

As the friction stir welding tool 1102 is rotated (as indicated by arrow 1120) and is traversed (as indicated by arrow 1124) during the friction stir welding process, the filler material is fed through the passageway 1104, the passageway 1101, and the openings 1105 and is entrained into the plasticized weld joint material. The filler material thus becomes an integral part of the weldment as a result of the material flow patterns created during the friction stir welding process.

Figure 12:
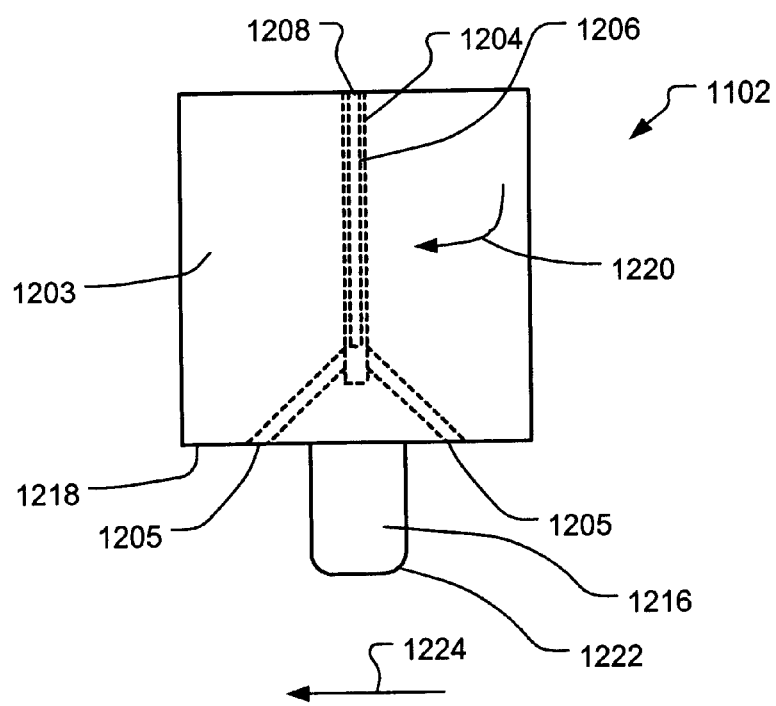
FIG. 12 is a side view of a friction stir welding tool according to a sixth embodiment of the present invention.

Turning now to FIG. 12, a sixth embodiment of the friction stir welding tool 212 in FIG. 2 is presented. As compared to the previously described embodiments, the illustrated embodiment includes a passageway 1204 extending from an entrance opening 1208 to one or more exit openings 1205 in a lower surface 1218 of a body 1203 through which the filler material may pass for incorporation into a weldment in the workpiece.

In one embodiment, a tubular liner 1206, made of a heat-resistant material (e.g., a ceramic material or the like) is disposed within the passageway 1204 to allow the filler material to pass through the passageway 1204 with less restriction. In the illustrated embodiment, the tubular liner extends generally partway through the passageway 1204; however, the scope of the present invention encompasses the tubular liner 1206, when present, extending along any portion of the passageway 1204. In the illustrated embodiment, the friction stir welding 1202 includes a pin 1216 and the lower surface 1218 of the body 1203, wherein the pin 1216 and the lower surface 1218 of the body 1203 contact and plasticize the weld areas in the workpiece or workpieces (not shown) during the friction stir welding process. In the illustrated embodiment, the lower surface 1218 has openings 1205 leading from the passageway 1204. The scope of the present invention, however, includes any configuration of the passageway 1204 and any number of openings 1205. The pin 1116 comprises a radiused portion 1222 that decreases an amount of force required to initially plunge the pin 1216 into the workpiece to be welded. However, it is within the scope of the present invention for the pin 1216 to omit the radiused portion 1222.

As the friction stir welding tool 1202 is rotated (as indicated by arrow 1220) and is traversed (as indicated by arrow 1224) during the friction stir welding process, the filler material is fed through the passageway 1204 and the openings 1205 and is entrained into the plasticized weld joint material. The filler material thus becomes an integral part of the weldment as a result of the material flow patterns created during the friction stir welding process.

Certain embodiments of the present invention comprise friction stir welding tools made of high strength, high hardness, wear-resistant materials, e.g., carbon tool steel and high speed steel. Further, certain friction stir welding tools have wear-resistant coatings applied thereto, e.g., carbide, a carbide compound, nitride, a nitride compound, and diamond coatings.

Thus, in a general sense, the present invention includes a friction stir welding tool through which a filler material is fed into the weldment. The passageway through which the filler material is fed may have any one of several cross-sectional profiles. Various embodiments may also have varying means for dispersing the filler material into the weldment, e.g., a tapered portion of the passageway proximal the exit opening of the passageway, varying numbers of openings through which filler material may be fed into the weldment, and varying numbers of protrusions extending radially inward proximal the exit opening of the passageway. The pin may also have any one of several external profiles—in fact, the external profile of the pin is not material to the practice of the invention. The invention also includes, again in a general sense, the introduction of a filler material into a weldment through the tool of an apparatus during a friction stir welding process. However, the invention admits wide variation in implementation, as is set forth above.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A friction stir welding tool, comprising:
   a body having passageway therethrough through which a filler material may pass; and
   a pin extending from a bottom of the body capable of creating friction when rotated against a workpiece to weld the workpiece.

2. A friction stir welding tool, according to claim 1, wherein the body further comprises a lower surface defining an exit opening in communication with the passageway through the body through which the filler material may pass for incorporation into a weldment in the workpiece.

3. A friction stir welding tool, according to claim 1, wherein the pin further comprises a passageway therethrough capable of receiving the filler material from the passageway through the body and through which filler material may pass.

4. A friction stir welding tool, according to claim 1, wherein the pin further comprises:
   a passageway therethrough capable of receiving the filler material from the passageway through the body and through which the filler material may pass; and
   a side surface defining an exit opening in communication with the passageway through the pin through which the filler material may pass for incorporation into a weldment in the workpiece.

5. A friction stir welding tool, according to claim 1, wherein the pin further comprises:
   a passageway therethrough capable of receiving the filler material from the passageway through the body and through which the filler material may pass; and
   a lower surface defining an exit opening in communication with the passageway through the pin through which the filler material may pass for incorporation into a weldment in the workpiece.

6. A friction stir welding tool, according to claim 1, further comprising a tubular liner disposed within the passageway through which the filler material may pass.

7. A friction stir welding tool, according to claim 6, wherein the tubular liner is made of a ceramic material.

8. A friction stir welding tool, according to claim 1, wherein the passageway further comprises a flared portion that transitions from a first diameter at a transition start location along the passageway to a second diameter at the exit opening.

9. A friction stir welding tool, according to claim 8, further comprising a tubular liner disposed within the passageway, wherein the tubular liner extends from the entrance opening to the transition start location.

10. A friction stir welding tool, according to claim 1, wherein the pin further comprises a side surface that tapers from a larger diameter adjacent the lower surface of the body to a smaller diameter at the lower surface of the pin.

11. A friction stir welding tool, according to claim 10, wherein the pin further comprises a radiused portion adjacent the lower surface of the pin.

12. A friction stir welding tool, according to claim 1, wherein the friction stir welding tool is made of a material selected from the group consisting of carbon tool steel and high-speed steel.

13. A friction stir welding tool, according to claim 1, further comprising a coating on the friction stir welding tool selected from the group consisting of carbide, a carbide compound, nitride a nitride compound, or diamond.

14. A friction stir welding tool, comprising:
   a body having an upper surface defining an entrance opening and a lower surface;
   a pin having a lower surface defining an exit opening and a side surface, wherein the pin extends from the lower surface of the body; and
   a passageway defined by the body and the pin, the passageway extending through the entrance opening to the exit opening and is capable of allowing a filler material to pass therethrough; and
   means for dispersing the filler material from the friction stir welding tool.

15. A friction stir welding tool, according to claim 14, further comprising a tubular liner disposed within the passageway through which the filler material may pass.

16. A friction stir welding tool, according to claim 15, wherein the tubular liner is made of a ceramic material.

17. A friction stir welding tool, according to claim 14, wherein the passageway further comprises a flared portion that transitions from a first diameter at a transition start location along the passageway to a second diameter at the exit opening.

18. A friction stir welding tool, according to claim 17, further comprising a tubular liner disposed within the passageway, wherein the tubular liner extends from the entrance opening to the transition start location.

19. A friction stir welding tool, according to claim 14, wherein the pin further comprises a side surface that tapers from a larger diameter adjacent the lower surface of the body to a smaller diameter at the lower surface of the pin.

20. A friction stir welding tool, according to claim 19, wherein the pin further comprises a radiused portion adjacent the lower surface of the pin.

21. A friction stir welding tool, according to claim 14, wherein the friction stir welding tool is made of a material selected from the group consisting of carbon tool steel and high-speed steel.

22. A friction stir welding tool, according to claim 14, further comprising a coating on the friction stir welding tool selected from the group consisting of carbide, a carbide compound, nitride a nitride compound, or diamond.

23. A friction stir welding tool, according to claim 14, wherein the means for dispersing the filler material from the friction stir welding tool further comprises at least one opening extending from the passageway through the side surface and the lower surface.

24. A friction stir welding tool, according to claim 23, wherein the at least one opening comprises a plurality of openings.

25. A friction stir welding tool, according to claim 14, wherein the means for dispersing the filler material from the friction stir welding tool further comprises at least one protrusion extending inwardly from the passageway adjacent the lower surface of the pin.

26. A friction stir welding tool, according to claim 25, wherein the at least one protrusion comprises a plurality of protrusions.

27. A friction stir welding tool, according to claim 14, wherein the means for dispersing the filler material from the friction stir welding tool further comprises:
   at least one opening extending from the passageway through the side surface and the lower surface of the pin; and
   at least one protrusion extending inwardly from the passageway adjacent the lower surface of the pin.

28. A friction stir welding tool, according to claim 27, wherein the at least one opening comprises a plurality of openings.

29. A friction stir welding tool, according to claim 27, wherein the at least one protrusion comprises a plurality of protrusions.

30. An apparatus capable of friction stir welding, comprising:
   a friction stir welding tool comprising:
      a body having passageway therethrough through which a filler material may pass; and
      a pin extending from a bottom of the body capable of creating friction when rotated against a workpiece to weld the workpiece;
   a spindle capable of rotating the friction stir welding tool, wherein the spindle has a passageway therethrough capable of allowing the filler material to pass therethrough and wherein the passageway through the spindle communicates with the passageway through the body;
   a filler material feeder capable of feeding the filler material, wherein the filler material feeder feeds the filler material into the passageway through the spindle; and
   a device capable of holding a workpiece.

31. An apparatus, according to claim 30, wherein the body further comprises a lower surface defining an exit opening in communication with the passageway through the body through which the filler material may pass for incorporation into a weldment in the workpiece.

32. An apparatus, according to claim 30, wherein the pin further comprises a passageway therethrough capable of receiving the filler material from the passageway through the body and through which filler material may pass.

33. An apparatus, according to claim 30, wherein the pin further comprises:
   a passageway therethrough capable of receiving the filler material from the passageway through the body and through which the filler material may pass; and
   a side surface defining an exit opening in communication with the passageway through the pin through which the filler material may pass for incorporation into a weldment in the workpiece.

34. An apparatus, according to claim 30, wherein the pin further comprises:
   a passageway therethrough capable of receiving the filler material from the passageway through the body and through which the filler material may pass; and
   a lower surface defining an exit opening in communication with the passageway through the pin through which the filler material may pass for incorporation into a weldment in the workpiece.

35. An apparatus, according to claim 30, wherein the filler material feeder comprises a filler material feeder capable of heating the filler material.

36. An apparatus, according to claim 30, further comprising a heater for heating the filler material.

37. An apparatus, according to claim 30, wherein the filler material feeder is capable of feeding the filler material at a constant feed rate.

38. An apparatus, according to claim 30, wherein the filler material feeder is capable of feeding the filler material at a variable feed rate.

39. An apparatus, according to claim 30, wherein the filler material feeder is capable of feeding the filler material intermittently.

40. An apparatus, according to claim 30, further comprising an anvil capable of forming a portion of a friction stir weld comprising a surface capable of being held against a workpiece and a depressed portion spaced away from the surface, wherein the depressed portion corresponds to a shape of the portion of the friction stir weld.

41. An apparatus, according to claim 40, wherein the depressed portion has a shape corresponding to a weld fillet.

42. An apparatus, according to claim 30, further comprising an apparatus for moving the spindle relative to the workpiece.

43. An apparatus, according to claim 42, wherein the apparatus is capable of moving the spindle.

44. An apparatus, according to claim 42, wherein the apparatus is capable of moving the workpiece.

45. An apparatus, according to claim 30, wherein the friction stir welding tool further comprises a tubular liner disposed within the passageway through the friction stir welding tool, wherein the tubular liner is capable of allowing the filler material to pass therethrough.

46. An apparatus, according to claim 45, wherein the tubular liner is made of a ceramic material.

47. An apparatus, according to claim 30, wherein the passageway through the friction stir welding tool further comprises a flared portion that transitions from a first diameter at a transition start location along the passageway through the friction stir welding tool to a second diameter at the exit opening.

48. An apparatus, according to claim 47, further comprising a tubular liner disposed within the passageway through the friction stir welding tool, wherein the tubular liner extends from the entrance opening to the transition start location.

49. An apparatus, according to claim 30, wherein the pin further comprises a side surface that tapers from a larger diameter adjacent the lower surface of the body to a smaller diameter at the lower surface of the pin.

50. An apparatus, according to claim 49, wherein the pin further comprises a radiused portion adjacent the lower surface of the pin.

51. An apparatus, according to claim 30, wherein the friction stir welding tool is made of a material selected from the group consisting of carbon tool steel and high-speed steel.

52. An apparatus, according to claim 30 further comprising a coating on the friction stir welding tool selected from the group consisting of carbide, a carbide compound, nitride a nitride compound, or diamond.

53. An apparatus capable of friction stir welding, comprising:
  a friction stir welding tool comprising:
    a body having an upper surface defining an entrance opening and a lower surface;
    a pin having a lower surface defining an exit opening and a side surface, wherein the pin extends from the lower surface of the body;
    a passageway defined by the body and the pin, the passageway extending from the entrance opening to the exit opening and is capable of allowing a filler material to pass therethrough; and
    means for dispersing the filler material from the friction stir welding tool;
  a spindle capable of rotating the friction stir welding tool, wherein the spindle has a passageway therethrough capable of allowing the filler material to pass therethrough and wherein the passageway through the spindle communicates with the passageway through the friction stir welding tool;
  a filler material feeder capable of feeding the filler material, wherein the filler material feeder feeds the filler material into the passageway through the spindle; and
  a device capable of holding a workpiece.

54. An apparatus, according to claim 53, wherein the filler material feeder further comprises a heated filler material feeder capable of heating the filler material.

55. An apparatus, according to claim 53, further comprising a heater for heating the filler material.

56. An apparatus, according to claim 53, wherein the means for dispersing the filler material from the friction stir welding tool further comprises at least one opening extending from the passageway through the side surface and the lower surface of the pin.

57. An apparatus, according to claim 56, wherein the at least one opening comprises a plurality of openings.

58. An apparatus, according to claim 53, wherein the filler material feeder is capable of feeding the filler material at a constant feed rate.

59. An apparatus, according to claim 53, wherein the filler material feeder is capable of feeding the filler material at a variable feed rate.

60. An apparatus, according to claim 53, wherein the filler material feeder is capable of feeding the filler material intermittently.

61. An apparatus, according to claim 53, further comprising an anvil capable of forming a portion of a friction stir weld comprising a surface capable of being held against the workpiece and a depressed portion spaced away from the surface, wherein the depressed portion corresponds to a shape of the portion of the friction stir weld.

62. An apparatus, according to claim 61, wherein the depressed portion has a shape corresponding to a weld fillet.

63. An apparatus, according to claim 53, further comprising an apparatus for moving the spindle relative to the workpiece.

64. An apparatus, according to claim 63, wherein the apparatus is capable of moving the spindle.

65. An apparatus, according to claim 63, wherein the apparatus is capable of moving the workpiece.

66. An apparatus, according to claim 53, wherein the friction stir welding tool further comprises a tubular liner disposed within the passageway through which the filler material may pass.

67. An apparatus, according to claim 66, wherein the tubular liner is made of a ceramic material.

68. An apparatus, according to claim 53, wherein the passageway through the friction stir welding tool further comprises a flared portion that transitions from a first diameter at a transition start location along the passageway through the friction stir welding tool to a second diameter at the exit opening.

69. An apparatus, according to claim 68, further comprising a tubular liner disposed within the passageway through the friction stir welding tool, wherein the tubular liner extends from the entrance opening to the transition start location.

70. An apparatus, according to claim 53, wherein the side surface that tapers from a larger diameter adjacent the lower surface of the body to a smaller diameter at the lower surface of the pin.

71. An apparatus, according to claim 70, wherein the pin further comprises a radiused portion adjacent the lower surface of the pin.

72. An apparatus, according to claim 53, wherein the friction stir welding tool is made of a material selected from the group consisting of carbon tool steel and high-speed steel.

73. An apparatus, according to claim 53, further comprising a coating on the friction stir welding tool selected from the group consisting of carbide, a carbide compound, nitride a nitride compound, or diamond.

74. An apparatus, according to claim 53, wherein the means for dispersing the filler material from the friction stir welding tool further comprises at least one protrusion extending inwardly from the passageway adjacent the lower surface of the pin.

75. An apparatus, according to claim 74, wherein the at least one protrusion comprises a plurality of protrusions.

76. An apparatus, according to claim 53, wherein the means for dispersing the filler material from the friction stir welding tool further comprises:
  at least one opening extending from the passageway through the side surface and the lower surface of the pin; and
  at least one protrusion extending inwardly from the passageway adjacent the lower surface of the pin.

77. An apparatus, according to claim 76, wherein the at least one opening comprises a plurality of openings.

78. An apparatus, according to claim 76, wherein the at least one protrusion comprises a plurality of protrusions.

79. A friction stir welding method, comprising:
  applying a frictional heating source to a workpiece to plasticize a volume of the workpiece;
  introducing a filler material into the volume of the workpiece;
  applying the frictional heating source to the filler material to plasticize the filler material; and
  incorporating the filler material into the volume of the workpiece.

80. A friction stir welding method, according to claim 79, further comprising heating the filler material before introducing the filler material into the volume of the workpiece.

81. A friction stir welding method, according to claim 79, further comprising traversing the frictional heating source along a joint between at least two portions of the workpiece.

82. A friction stir welding method, according to claim 79, wherein introducing the filler material further comprises introducing the filler material at a constant feed rate.

83. A friction stir welding method, according to claim 79, wherein introducing the filler material further comprises introducing the filler material at a variable feed rate.

84. A friction stir welding method, according to claim 79, wherein introducing the filler material further comprises introducing the filler material intermittently.

85. A friction stir welding method, according to claim 79, further comprising forging the incorporated filler material and the volume of the workpiece against an anvil.

86. A friction stir welding method, according to claim 85, wherein forging the incorporated filler material and the volume of the workpiece against the anvil further comprises forging the incorporated filler material and the volume of the workpiece against the anvil to produce a weld fillet.

87. A friction stir welding method, according to claim 79, wherein introducing the filler material into the volume of the workpiece further comprises introducing at least one material selected from the group consisting of a solid wire, a tubular wire filled with powdered filler material, a powder, a liquid, a solid wire having a dispersion strengthening material therein, a tubular wire at least partially filled with a dispersion strengthening material, a powder having a dispersion strengthening material therein, a liquid having a dispersion strengthening material therein, a carbide powder, a nitride powder, an oxide powder, a ceramic powder, and chopped ceramic fibers into the volume of the workpiece.

88. A friction stir welding method, comprising:
rotating a friction stir welding tool;
plunging the friction stir welding tool into a workpiece at a first position;
plasticizing a portion of the workpiece at the first position by frictional heating induced by the friction stir welding tool;
feeding a filler material into an interface between the friction stir welding tool and the workpiece;
plasticizing the filler material by frictional heating induced by the friction stir welding tool; and
incorporating the filler material into the plasticized portion of the workpiece.

89. A friction stir welding method, according to claim 88, further comprising heating the filler material before introducing the filler material into the volume of the workpiece.

90. A friction stir welding method, according to claim 88, further comprising traversing the friction stir welding tool to a second position on the workpiece.

91. A friction stir welding method, according to claim 88, further comprising:
halting the feeding of the filler material into the interface between the friction stir welding tool and the workpiece; and
retracting the friction stir welding tool from the workpiece.

92. A friction stir welding method, according to claim 88, further comprising retracting the friction stir welding tool from the workpiece.

93. A friction stir welding method, according to claim 88, wherein introducing the filler material further comprises introducing the filler material at a constant feed rate.

94. A friction stir welding method, according to claim 88, wherein introducing the filler material further comprises introducing the filler material at a variable feed rate.

95. A friction stir welding method, according to claim 88, wherein introducing the filler material further comprises introducing the filler material intermittently.

96. A friction stir welding method, according to claim 88, further comprising forging the incorporated filler material and the volume of the workpiece against an anvil.

97. A friction stir welding method, according to claim 96, wherein forging the incorporated filler material and the volume of the workpiece against the anvil further comprises forging the incorporated filler material and the volume of the workpiece against the anvil to produce a weld fillet.

98. A friction stir welding method, according to claim 88, wherein introducing the filler material into the volume of the workpiece further comprises introducing at least one material selected from the group consisting of a solid wire, a tubular wire filled with powdered filler material, a powder, a liquid, a solid wire having a dispersion strengthening material therein, a tubular wire at least partially filled with a dispersion strengthening material, a powder having a dispersion strengthening material therein, a liquid having a dispersion strengthening material therein, a carbide powder, a nitride powder, an oxide powder, a ceramic powder, and chopped ceramic fibers into the volume of the workpiece.

99. A method comprising introducing a filler material into a weld nugget during a friction stir welding process.

100. A method, according to claim 99, wherein introducing the filler material into the weld nugget further comprises introducing a material selected from the group consisting of a solid wire, a tubular wire filled with powdered filler material, a powder, a liquid, a solid wire having a dispersion strengthening material therein, a tubular wire at least partially filled with a dispersion strengthening material, a powder having a dispersion strengthening material therein, a liquid having a dispersion strengthening material therein, a carbide powder, a nitride powder, an oxide powder, a ceramic powder, and chopped ceramic fibers into the weld nugget during the friction stir welding process.

101. An apparatus capable of friction stir welding, comprising:
means for applying a frictional heating source to a workpiece to plasticize a volume of the workpiece;
means for introducing a filler material into the volume of the workpiece;
means for applying the frictional heating source to the filler material to plasticize the filler material; and
means for incorporating the filler material into the volume of the workpiece.

102. An apparatus, according to claim 101, further comprising means for heating the filler material before introducing the filler material into the volume of the workpiece.

103. An apparatus, according to claim 101, further comprising means for traversing the frictional heating source along a joint between at least two portions of the workpiece.

104. An apparatus, according to claim 101, wherein the means for introducing the filler material further comprises means for introducing the filler material at a constant feed rate.

105. An apparatus, according to claim 101, wherein the means for introducing the filler material further comprises means for introducing the filler material at a variable feed rate.

106. An apparatus, according to claim 101, wherein the means for introducing the filler material further comprises means for introducing the filler material intermittently.

107. An apparatus, according to claim 101, further comprising means for forging the incorporated filler material and the volume of the workpiece against an anvil.

108. An apparatus, according to claim 107, wherein the means for forging the incorporated filler material and the volume of the workpiece against the anvil further comprises means for forging the incorporated filler material and the volume of the workpiece against the anvil to produce a weld fillet.

109. An apparatus, according to claim 101, wherein the means for introducing the filler material into the volume of the workpiece further comprises means for introducing at least one material selected from the group consisting of a solid wire, a tubular wire filled with powdered filler material, a powder, a liquid, a solid wire having a dispersion strengthening material therein, a tubular wire at least partially filled with a dispersion strengthening material, a powder having a dispersion strengthening material therein, a liquid having a dispersion strengthening material therein, a carbide powder, a nitride powder, an oxide powder, a ceramic powder, and chopped ceramic fibers into the volume of the workpiece.

110. An apparatus capable of friction stir welding, comprising:

means for rotating a friction stir welding tool;

means for plunging the friction stir welding tool into a workpiece at a first position;

means for plasticizing a portion of the workpiece at the first position by frictional heating induced by the friction stir welding tool;

means for feeding a filler material into an interface between the friction stir welding tool and the workpiece;

means for plasticizing the filler material by frictional heating induced by the friction stir welding tool, and means for incorporating the filler material into the plasticized portion of the workpiece.

111. An apparatus, according to claim 110, further comprising means for heating the filler material before introducing the filler material into the volume of the workpiece.

112. An apparatus, according to claim 110, further comprising means for traversing the friction stir welding tool to a second position on the workpiece.

113. An apparatus, according to claim 110, further comprising:

means for halting the feeding of the filler material into the interface between the friction stir welding tool and the workpiece; and means for retracting the friction stir welding tool from the workpiece.

114. An apparatus, according to claim 110, further comprising means for retracting the friction stir welding tool from the workpiece.

115. An apparatus, according to claim 110, wherein the means for introducing the filler material further comprises means for introducing the filler material at a constant feed rate.

116. An apparatus, according to claim 110, wherein the means for introducing the filler material further comprises means for introducing the filler material at a variable feed rate.

117. An apparatus, according to claim 110, wherein the means for introducing the filler material further comprises means for introducing the filler material intermittently.

118. An apparatus, according to claim 110, further comprising means for forging the incorporated filler material and the volume of the workpiece against an anvil.

119. An apparatus, according to claim 118, wherein the means for forging the incorporated filler material and the volume of the workpiece against the anvil further comprises means for forging the incorporated filler material and the volume of the workpiece against the anvil to produce a weld fillet.

120. An apparatus, according to claim 110, wherein the means for introducing the filler material into the volume of the workpiece further comprises means for introducing at least one material selected from the group consisting of a solid wire, a tubular wire filled with powdered filler material, a powder, a liquid, a solid wire having a dispersion strengthening material therein, a tubular wire at least partially filled with a dispersion strengthening material, a powder having a dispersion strengthening material therein, a liquid having a dispersion strengthening material therein, a carbide powder, a nitride powder, an oxide powder, a ceramic powder, and chopped ceramic fibers into the volume of the workpiece.

121. An apparatus comprising means for introducing a filler material into a weld nugget during a friction stir welding process.

122. An apparatus, according to claim 121, wherein the means for introducing the filler material into the weld nugget further comprises means for introducing a material selected from the group consisting of a solid wire, a tubular wire filled with powdered filler material, a powder, a liquid, a solid wire having a dispersion strengthening material therein, a tubular wire at least partially filled with a dispersion strengthening material, a powder having a dispersion strengthening material therein, a liquid having a dispersion strengthening material therein, a carbide powder, a nitride powder, an oxide powder, a ceramic powder, and chopped ceramic fibers into the weld nugget during the friction stir welding process.

* * * * *